United States Patent [19]
Hughes et al.

[11] 3,923,079
[45] Dec. 2, 1975

[54] FLUID CONTROL VALVE

[75] Inventors: John Malcolm Kyffin Hughes, Solihull; Graham Albert John Lake; Stephen John Ford, both of Birmingham, all of England

[73] Assignee: Parkinson Cowan Appliances Limited, Birmingham, England

[22] Filed: Dec. 12, 1973

[21] Appl. No.: 426,623

[52] U.S. Cl. ............ 137/614.14; 137/495; 137/613; 251/129
[51] Int. Cl.² ........................................ F16K 17/168
[58] Field of Search .......... 137/614.14, 614.11, 495, 137/613, 614.19, 614.20; 251/30, 129, 130

[56] References Cited
UNITED STATES PATENTS

| | | | |
|---|---|---|---|
| 1,707,630 | 4/1929 | Erceg | 137/614.11 |
| 2,639,727 | 5/1953 | Ray | 251/129 X |
| 2,821,206 | 1/1958 | Holmes | 137/614.19 X |
| 2,826,215 | 3/1958 | Wolfslau et al. | 251/129 X |
| 2,842,146 | 7/1958 | Schuster | 137/495 X |
| 2,938,539 | 5/1960 | Holmes | 137/495 X |
| 2,987,309 | 6/1961 | Biggle | 137/495 X |
| 3,115,891 | 12/1963 | Rimm | 137/495 |
| 3,189,041 | 6/1965 | Hansen | 137/495 X |
| 3,236,261 | 2/1966 | Morgan | 251/129 X |
| 3,343,557 | 9/1967 | Dunn | 137/614.11 X |
| 3,387,622 | 6/1968 | Weinstein | 137/495 |
| 3,519,022 | 7/1970 | Chung et al. | 251/30 X |
| 3,724,808 | 4/1973 | Sugden, Jr. | 251/30 |

*Primary Examiner*—Charles J. Myhre
*Assistant Examiner*—Ira S. Lazarus

[57] ABSTRACT

A fluid control valve comprising a body in which are formed first second and third chambers. Between said first and second chambers there is a first valve member operable between a first position in which in use it precludes fluid flow between said first and second chambers and a second position in which it permits such fluid flow. There is also provided a second valve member which is operable in use to control the quantity of fluid flow between the second and third chambers in response to one or more predetermined parameters.

2 Claims, 1 Drawing Figure

U.S. Patent  Dec. 2, 1975  3,923,079
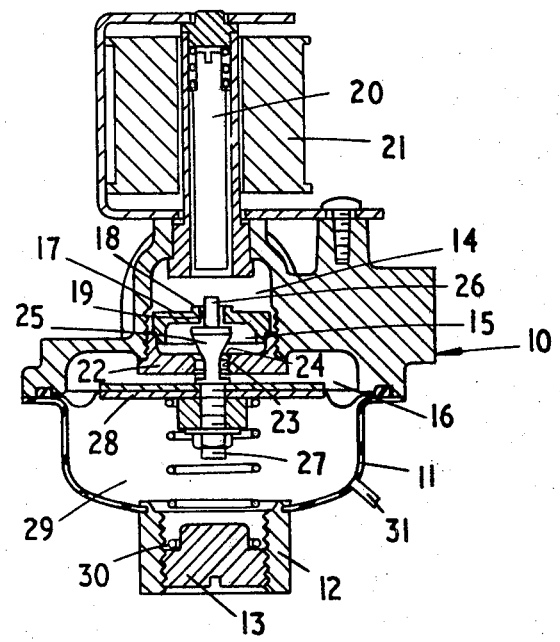

FLUID CONTROL VALVE

This invention relates to a fluid control valve and has as its object the provision of such a valve in a convenient form.

In accordance with the present invention there is provided a fluid control valve comprising a body, first, second and third chambers within said body, a first valve member operable between a first position in which in use it precludes fluid flow between said first and second chambers and a second position in which it permits fluid flow between said first and second chambers, and a second valve member operable in use to control the quantity of fluid flow between said second and third chambers in response to one or more predetermined parameters.

Preferably, said second valve member is operatively connected to a diaphragm movable in use in response to a variation in said one or more parameters. Conveniently, the diaphragm partly defines the third chamber and extends between said third chamber and a compensating chamber which is subject to one or more sources of pressure which comprise said one or more predetermined parameters.

Desirably, said second valve member includes an abutment engageable by said first valve member when the latter is in its first operative position to urge said second valve member into a position in which in use it precludes fluid flow between said second and third chambers.

Conveniently, said first valve member is solenoid operated.

A fluid control valve in accordance with the invention may be used conveniently to control the flow of gas to a gas burner incorporated in a central heating installation and where a diaphragm is provided as mentioned above the diaphragm may be arranged to be movable in response to a pressure representative of the pressure of air delivered by a fan feeding combustion air to said burner and/or to a pressure representative of the air pressure acting in use on the outer end of a flue associated with the installation.

Moreover, said diaphragm may be acted upon by manually adjustable resilient means.

The invention will now be more particularly described with reference to the accompanying drawing which is a sectional view of one embodiment of a fluid control valve constructed in accordance with the present invention.

Referring to the drawing, the valve shown therein comprises a body 10 which includes a removable generally cup-shaped cap 11 having an apertured base which aperture receives an internally screw-threaded sleeve 12 and co-operating externally screw-threaded screw 13. A first chamber 14, a second chamber 15 and a third chamber 16 are defined within the body 10 wherein the first chamber 14 communicates directly with a gas inlet (not shown) and wherein the third chamber 16 communicates directly with a gas outlet (also not shown).

The first and second chambers 14 and 15 are separated by a first apertured partition wall 17 having a valve seat 18 surrounding that axial end of the aperture 19 formed in the partition wall 17 adjacent the first chamber 14. A plunger 20 of a solenoid 21 is slidably and sealingly mounted in a portion of the body 10 which defines part of the first chamber 14, the plunger 20 being axially aligned with the aperture 19 so that energisation of the solenoid 21 will cause the plunger 20 to move from a first operative position in which one axial end of the plunger 20 sealingly engages the valve seat 18 to preclude gas flow between the first and second chambers 14 and 15 respectively, to a second operative position (as shown) in which the plunger 20 permits gas flow between the first and second chambers 14 and 15.

A second apertured partition wall 22 separates the second and third chambers 15 and 16, that axial end of the aperture 23 formed in the second partition wall 22 adjacent the second chamber 15 having a frusto-conical seat portion 24 for co-operation with a frusto-conical control valve member 25. The valve member 25 is provided at opposite axial ends with integral stems 26 and 27 respectively. The stem 26 projecting from the larger diameter end of the valve member 25 is in use engaged by said one axial end of the plunger 20 when the latter is in its first operative position to urge the valve member 25 into engagement with the seat 24 and thus prevent flow between chambers 15 and 16. The stem 27 projects through the aperture 23 in the partition wall 22 and is secured to a diaphragm 28 which partly defines the chamber 16 and which also defines together with the cap 11 a compensating chamber 29. Resilient means in the form of a coiled compression spring 30 is axially located between the underside of the diaphragm 28 and the screw 13 such that by turning the screw manually relative to the sleeve 12 the pressure exerted by the spring 30 on the diaphragm 28 can be altered.

The control valve hereinbefore described is intended to control the flow of gas to a gas burner incorporated in a central heating installation which includes a fan for feeding combustion air to said gas burner. The compensating chamber 29 is provided with an inlet 31 which is connected to a source of pressure representative of the pressure of air delivered by said fan. If therefore, the fan is set to operate at a certain speed, the pressure of air within the chamber 29 will reinforce the force applied by the spring 30 on the diaphragm 28 to provide for a certain degree of opening of the valve member 25 and a certain rate of flow of gas from chamber 15 to chamber 16. If the fan speed is increased then the air pressure in chamber 29 will also increase to provide a larger degree of opening of the valve member 25 and an increased rate of flow of gas. Thus if the quantity of combustion air delivered to the burner is increased so will the quantity of gas delivered to the burner be increased. Moreover, the inlet 31 may also be connected to a source of pressure representative of the air pressure acting in use on the outer end of a flue associated with the central heating installation. This will serve to balance or at least minimise the effects of such air pressure on the suction applied in use to the third chamber 16.

Thus, in use, the plunger 20 and coacting valve seat 18 serve only as an on-off valve whereas the valve member 25 and its coacting seat 24 serve as a control valve which, as an additional safety measure, is closed by the plunger 20 when the latter engages its coacting seat portion 18. This has the advantage that when the plunger 20 moves to its second operative position in which gas can flow from the first chamber 14 to the second chamber 15 then the valve member 25 will move slowly from a closed position to a position in which it controls the quantity of gas issuing from the outlet of the control valve since the pressure in the compensating chamber 29 applies effective damping to movement of the diaphragm 28 and this precludes or minimises any overshoot of the valve member 25 to a position in which it allows more gas to flow between the chambers 15 and 16 than is desired. Instead of connecting a source of pressure representative of the pressure of air delivered by the combustion air fan or a source of pressure representative of the air pressure acting in use on the outer end of the flue to the compensating chamber 29, one or more other sources of pressure representing one or more other parameters may be connected to the inlet 31.

We claim:

1. A fluid control valve comprising a body, first, second and third chambers within said body, a first valve member operable between a first position in which in use it precludes fluid flow between said first and second chambers and a second position in which it permits fluid flow between said first and second chambers, and a second valve member operable in use to control the quantity of fluid flow between said second and third chambers, said second valve member being operatively connected to a diaphragm which extends between said third chamber and a compensating chamber which is connected to an external source of pressure, said second valve member including an abutment engageable by said first valve member when the latter is in its first position to urge said second valve member into a position in which it precludes fluid flow between said second and third chambers, said second valve member being movable with said diaphragm when the first valve member is in its second position.

2. A fluid control valve as claimed in claim 1 wherein said first valve member is solenoid operated.

* * * * *